United States Patent [19]

Morita et al.

[11] Patent Number: 5,010,149

[45] Date of Patent: Apr. 23, 1991

[54] CAN INTERIOR COATING COMPOSITION

[75] Inventors: Kaoru Morita; Atsushi Shioda, both of Hiratsuka, Japan

[73] Assignee: Kansai Paint Co., Ltd., Amagasaki, Japan

[21] Appl. No.: 448,326

[22] Filed: Nov. 6, 1989

[30] Foreign Application Priority Data

Nov. 11, 1988 [JP] Japan ................ 63-283773

[51] Int. Cl.$^5$ .............. C08F 283/00; C08G 8/28; C08L 61/00; C08L 61/06
[52] U.S. Cl. .................. 525/481; 525/396; 525/482
[58] Field of Search ............ 525/481, 396, 482

[56] References Cited

U.S. PATENT DOCUMENTS

| | | | |
|---|---|---|---|
| 2,907,726 | 10/1959 | Greenlee | 260/19 |
| 2,907,730 | 10/1959 | Greenlee | 260/19 |
| 2,907,731 | 10/1959 | Greenlee | 260/19 |
| 3,932,144 | 1/1976 | Matsubara et al. | 29/195 |
| 3,985,695 | 10/1976 | Tobias et al. | 260/29.2 EP |
| 4,018,848 | 4/1977 | Khanna | 260/834 |
| 4,151,305 | 4/1979 | Davis et al. | 426/131 |
| 4,212,781 | 7/1980 | Evans et al. | |
| 4,296,005 | 10/1981 | DiBenedetto | 260/18 EP |
| 4,302,373 | 11/1981 | Steinmetz | 260/29.3 |
| 4,362,853 | 12/1982 | Demmer | 525/533 |
| 4,367,318 | 1/1983 | Ishimura et al. | 525/481 |
| 4,467,070 | 8/1984 | Kordomenos et al. | 525/110 |
| 4,477,610 | 10/1984 | Ishimura et al. | |
| 4,485,199 | 11/1984 | Kordomenos et al. | 523/400 |
| 4,497,938 | 2/1985 | Kordomenos | 525/514 |
| 4,596,861 | 6/1986 | Sheih et al. | 525/481 |
| 4,722,982 | 2/1988 | Tanaka | 525/481 |
| 4,812,537 | 3/1989 | Maki | 525/481 |

FOREIGN PATENT DOCUMENTS

| | | |
|---|---|---|
| 0115432 | 8/1984 | European Pat. Off. ........ 525/481 |
| 1248199 | 8/1967 | Fed. Rep. of Germany . |
| 59-15458 | 1/1959 | Japan . |
| 53-1285 | 3/1978 | Japan . |
| 55-3481 | 4/1980 | Japan . |
| 58-198513 | 4/1983 | Japan . |
| 60-106805 | 9/1985 | Japan . |
| 2275166 | 11/1987 | Japan ........ 525/481 |

*Primary Examiner*—John C. Bleutge
*Assistant Examiner*—William R. H. Clark
*Attorney, Agent, or Firm*—Fisher, Christen & Sabol

[57] ABSTRACT

Disclosed is a can interior coating composition which contains (A) a modified bisphenol based epoxy resin formed by introducing at least one of a functional group represented by the following formula:

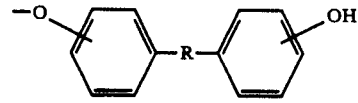

where R is a bivalent aliphatic hydrocarbon group having 1 to 4 carbon atoms, into a molecular terminal of a bisphenol based epoxy resin having an epoxy equivalent of 180 to 7,000 and a number average molecular weight of 350 to 10,000, and (B) a resol phenol resin obtained by reacting the modified bisphenol based epoxy resin (A) with formaldehydes in the presence of a basic catalyst.

4 Claims, No Drawings

CAN INTERIOR COATING COMPOSITION

BACKGROUND OF THE INVENTION (1) Field of the Invention:

This invention relates to a can interior coating composition suitably applicable to a very short time curing process, and more particularly to the can interior coating composition which exhibits such properties as excellent at hygienic properties, retorting resistant properties, adhesion properties, process ability, flavor properties, corrosion resistance, water resistance and the like when applied to the very short time curing process.

(2) Description of the Prior Art:

The widely known can interior coating compositions for coating an interior surface of a can for use in canning etc. include mixtures of a high molecular weight epoxy resin having an epoxy equivalent of 1,650 to 3,500 with at least one resin component selected from a group consisting of a resol phenol resin and an amino resin, or precondensates thereof.

Japanese Patent Application Laid-Open No. 142068/88 discloses for the purpose of providing improved retorting resistant properties a method of utilizing mixtures of a reaction product which is obtained by a reaction between epichlorohydrin and bisphenol compounds and terminal groups of which are mostly phenolic hydroxyl group, with at least one resin component selected from a group consisting of a resol phenol resin and an amino resin, or precondensates thereof.

Recently, however, many processes, in which curing is carried out during a very short period of time after coating the can interior coating composition, have been employed to meet needs of improvement in productivity and of cost down from can makers.

Specifically, the curing has recently been carried out for such a short period of time as 20 to 30 seconds compared with 90 to 120 seconds in the previous processes.

It has been pointed out that the can interior coating composition in the prior art raises problems caused by the use of the conventional resol resin, i.e. problems that such performances as at potassium permanganate consumed, flavor properties and the like are unsatisfactory to meet the above needs.

Moreover, problems of process ability, adhesion properties, retorting resistant properties, corrosion resistance and the like remain unsolved because of lack of sufficient time period to cure after coating the can interior coating composition.

SUMMARY OF THE INVENTION

It is an object of the present invention to provide a can interior coating composition which is suitably applicable to a very short time curing process and which exhibits such properties as excellent at hygienic properties, retorting resistant properties, adhesion properties, process ability, flavor properties, corrosion resistance, water resistance and the like when applied to the very short time curing process.

The present invention provides a can interior coating composition which contains (A) a modified bisphenol based epoxy resin formed by introducing at least one of a functional group represented by the following formula:

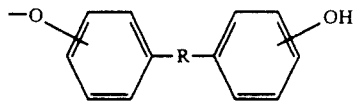

where R is a bivalent aliphatic hydrocarbon group having 1 to 4 carbon atoms, into a molecular terminal of a bisphenol based epoxy resin having an epoxy equivalent of 180 to 7,000 and a number average molecular weight of 350 to 10,000, and (B) a resol phenol resin obtained by reacting the modified bisphenol based epoxy resin (A) with formaldehydes in the presence of a basic catalyst.

The modified bisphenol based epoxy resin (A) used in the present invention may be prepared by the following process.

A bisphenol based epoxy resin having an epoxy equivalent of 180 to 7,000 and a number average molecular weight of 350 to 10,000 is reacted directly with bisphenol. This reaction may easily be carried out normally at 130° to 200° C. In order that a bisphenol residual group may remain on a molecular terminal of a reaction product, a mixing ratio of the epoxy resin to bisphenol is required to be in the range of 1 to 2 moles, preferably 1.1 to 1.4 moles of phenolic hydroxyl group in the former per one mole of epoxy group in the latter.

Examples of commercially available ones of the above epoxy resin include Epikote 1007 (trade name of epoxy resin marketed by Shell Chemical Co., Ltd., having an epoxy equivalent of about 1,700 and a number average molecular weight of about 2,900), Epikote 1009 (trade name of epoxy resin marketed by Shell Chemical Co., Ltd., having an epoxy equivalent of 3,500 and a number average molecular weight of about 3,750), Epiclon 7055 (trade name of epoxy resin marketed by Dainippon Ink and Chemicals, Incorporated, having an epoxy equivalent of about 1,800 and a number average molecular weight of about 2,900), and the like.

The above bisphenol includes ones represented by the general formula:

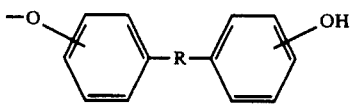

where R is as above defined, specifically, for example, bis(4-hydroxyphenyl)-2,2-propane (bisphenol A), bis(4-hydroxyphenyl)methane (bisphenol F), bis(4-hydroxyphenyl)-1,1-ethane, bis(4-hydroxyphenyl)-1,1-isobutane, and the like, of these bisphenol A being preferred.

On the other hand, the resol phenol resin (B) used in the present invention may be prepared by a resol-forming reaction, i.e. a resolification reaction of the modified bisphenol based epoxy resin (A) with formaldehydes.

The modified bisphenol based epoxy resin (A) used in the resolification reaction advantageously includes such ones that the bisphenol based epoxy resin constituting the modified bisphenol based epoxy resin (A) has a number average molecular weight of 350 to 6,000, preferably 350 to 1,000 and an epoxy equivalent of 150 to 4,000, preferably 150 to 700.

Thus, the above bisphenol based epoxy resin is reacted with bisphenols to obtain the modified bisphenol based epoxy resin (A) which has an epoxy equivalent of 500 or more, preferably 10,000 or more and bisphenols reacted on one terminal or both terminals of the epoxy resin molecule for being used. The resolification reaction by use of the modified bisphenol based epoxy resin is carried out by dissolving the modified resin in an organic solvent, followed by adding formaldehydes to be reacted in the presence of a basic catalyst. The organic solvent used in the above reaction may include ones to dissolve the modified bisphenol based epoxy resin, for example, alcohols such as n-butyl alcohol, cellosolves such as butylcellosolve, and the like.

The basic catalyst used may includes well known ones as the resolification catalyst, for example, metal alkalis such as sodium hydroxide, calcium hydroxide and the like, basic salts such as tribasic sodium phosphate, amines such as triethylamine, and the like. The above basic catalyst is used in an amount of 0.005 to 0.2 mole per one mole of the modified bisphenol based epoxy resin. When the above amount is less than 0.005 mole, the rate of the resolification reaction is very low, and when it is more than 0.2 mole, the catalyst residue in the produced resin causes troubles. Formaldehydes used in the resolification reaction include an aqueous formalin, formaldehyde, which is dissolved in an organic solvent, and paraformaldehyde. The formaldehydes are used in an amount of 2 to 6 moles, preferably 4 to 6 moles per one mole of the terminal bisphenol of the modified bisphenol based epoxy resin. When the above amount is more than 6 moles, the amount of free formalin in the produced resin is so increased that problems such as irritating odor troubles are increased. On the other hand, when it is less than 2 moles, the resolification reaction does not proceed satisfactorily and it is difficult to achieve the intended result.

The resol phenol resin synthesized according to the above process has such characteristics that it contains appreciably less amounts of low molecular weight ingredient compared with the conventional resol phenol resin synthesized from phenols, and has excellent properties at potassium permanganate consumed, flavor properties, process ability, retorting resistant properties and the like.

The mixing ratio of the above component (A) to the component (B) is generally in the range of 40 to 95 parts by weight, preferably 50 to 70 parts by weight of the former to 60 to 5 parts by weight, preferably 50 to 30 parts by weight of the latter. When the above ratio is outside the above range, applicability to the above short time curing process is so greatly inhibited that the intended object may not be achieved.

The can interior coating composition of the present invention contains the above components (A) and (B) as the essential components, and may include as optional additives, for example, curing promotors i.e. acid catalysts such as phosphoric acid and p-toluenesulfonic acid, dryers such as manganese naphthenate and cobalt naphthenate, amines such as trimethylamine and triethylamine, organic peroxides such as benzoyl peroxide, and the like; organic solvents such as aromatic solvent, aliphatic solvent, ketone solvent, ester solvent, glycol solvent and the like, plasticizers, pigments, surfactants, lubricants, amino resin, vinyl acetate resin, vinyl chloride-vinyl acetate copolymer resin, polyester resin, polyvinyl chloride resin, polyolefin resin, polyamide resin, and the like.

The use of the modified bisphenol based epoxy resin (A) obtained by reacting the terminal epoxy group of the specified high molecular weight epoxy resin with bisphenol to introduce at least one, generally 1 to 2 of the functional group:

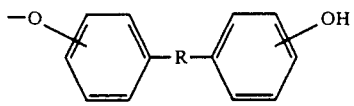

into the epoxy resin in the can interior coating composition of the present invention results in that the modified epoxy resin (A) can be mixed for use with the resol phenol resin (B) in a broad formulation range and that the film formed therefrom shows no haze.

Moreover, the methylol group of the resol phenol resin (B), i.e.

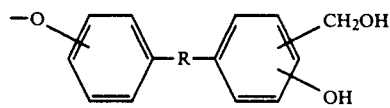

can attack against an ortho position to the phenolic hydroxyl group in the modified bisphenol based epoxy resin (A), resulting in that the above component (A) has more functional groups than the conventional one having epoxy group on its terminal, and in that reaction takes place very easily to provide the can interior coating composition which shows an excellent applicability to the short time curing process without impairing film performances such as hardness, adhesion properties, process ability, retorting resistant properties and the like even if molecular weight is increased during reaction.

The present invention is explained more in detail by the following Examples and Comparative Examples, in which "part" and "%" are all by weight.

Preparation Examples of Modified Epoxy Resin (A)

Preparation Example 1

A flask equipped with a stirrer, thermometer and cooling condenser is charged with 587 parts of Epikote 1009 (epoxy resin marketed by Shell Chemical, Co., Ltd.; epoxy equivalent: 2,790), 26 parts of bisphenol A and 513 parts of 3-methoxybutyl acetate, followed by being kept at 130° C. with agitation. About 12 hours after, the epoxy value shows 0.004. Thereafter, 377 parts of methyl isobutyl ketone is added to obtain a modified epoxy resin having a concentration of 40%.

PREPARATION EXAMPLE 2

A flask is charged with 389 parts of Epikote 828 (epoxy resin marketed by Shell Chemical, Co., Ltd.; epoxy equivalent: 188) as an epoxy resin, 201 parts of bisphenol A and 163 parts of 3-methoxybutyl acetate to be kept at 130° C. About 8 hours after, epoxy value shows 0.0038. Thereafter, 422 parts of 3-methoxybutyl acetate and 390 parts of methyl isobutyl ketone are added to obtain a modified epoxy resin having a concentration of 40%.

Preparation Examples of Resol Phenol Resin (B)

Preparation Example 3

A reactor equipped with a stirrer and a reflux condenser is charged with 228 parts of bisphenol A, 188 parts of Epikote 828 and 0.1% of tri-n-butylamine, followed by heating up to 160° C. and reacting for 4 hours to synthesize a modified bisphenol A-terminated epoxy resin having an epoxy equivalent of 10,500. After cooling, 229 parts of n-butanol is added to dissolve the above modified epoxy resin, and further 22 parts of 1N-NaOH is added. Thereafter 324 parts of 37% aqueous formalin is added, followed by heating up to 90° C. to carry out resolification reaction for 4 hours. Next, washing with water is carried out to discharge separating solvent and water, followed by heating under a vacuum of 650 mmHg, and by removing water, solvent and free formalin respectively. At the time when a concentration of 70% is reached, n-butanol is added to dilute to 55% and to obtain a resol phenol resin having a weight average molecular weight of 3,200.

Preparation Example 4

A reactor equipped with a stirrer and a reflux condenser is charged with 163 parts of bisphenol A, 188 parts of Epikote 828, 0.1% of tri-n-butylamine and 38 parts of butylcellosolve for reacting at 160° C. for 4 hours to synthesize a modified bisphenol A-terminated epoxy resin having an epoxy equivalent of 14,000. Next, after cooling, 160 parts of n-butanol is added to dissolve the above modified epoxy resin, followed by adding 46 parts of 1N-NaOH, adding 348 parts of 37% aqueous formalin, and by heating up to 90° C. for carrying out the resolification reaction for 6 hours. Thereafter, washing with water is carried out to discharge the separating solvent and water, followed by heating under a vacuum of 650 mmHg, and by removing water, solvent and free formalin respectively. At a time when the concentration reaches 65%, n-butanol is added to dilute to 65% and to obtain a resol phenol resin having a weight average molecular weight of 4,500.

Preparation Example 5 (for comparison)

A reactor equipped with a stirrer and a reflux condenser is charged with 288 parts of bisphenol A, 228 parts of n-butanol, 9.33 parts of triethylamine and 324 parts of 37% aqueous formalin to be heated up to 90° to 95° C., followed by reacting under reflux for 6 hours, and by removing water, solvent and free formalin respectively. At a time when a concentration of 70% is reached, n-butanol is added to dilute to 55%.

Preparation Example 6 (for comparison)

A reactor equipped with a stirrer and a reflux condenser is charged with 228 parts of bisphenol A, 228 parts of n-butanol, 5.0 parts of ammonia and 324 parts of 37% aqueous formalin, followed by heating up to 90° to 95° C. for reacting under reflux for 6 hours, and charging 7 parts of phosphoric acid to react for one hour. Next, separated water is discharged, followed by heating under a vacuum of 650 mmHg, and by removing water, solvent and free formalin respectively. At a time when a concentration of 70% is reached, n-butanol is added to dilute to 55%.

EXAMPLE 1

A mixture of 70 parts (as solids) of the modified epoxy resin obtained in Preparation Example 1 and 30 parts (as solids) of the resol phenol resin obtained in Preparation Example 3 is formed, followed by adding 0.2 part of phosphoric acid per 100 parts of the above two components of the mixture, and by diluting with xylene to a solid concentration of 30% to prepare a can interior coating composition of the present invention.

EXAMPLES 2-4 AND COMPARATIVE EXAMPLES 1-6

The procedures of Example 1 are repeated except that the modified epoxy resin (A) and the resol phenol resin (B) are mixed at such ratios as shown in the following Table 1 to obtain coating compositions.

The coating compositions obtained in the above Examples and Comparative Examples are coated onto a #25 tinplate or a 100 μm aluminum foil to a dry film thickness of 5-6 μm by use of an applicator, followed by curing in a tunnel gas oven under such conditions that the temperature of the tinplate or the aluminum foil is kept at 200° C. for 30 seconds. The test pieces thus obtained are subjected to the tests of adhesion properties, retorting resistant properties, gel fraction, process ability, potassium permanganate consumed, aqueous extract flavor properties and corrosion resistance. Separately, a coated tinplate prepared as above except that the dry film thickness is 30 to 35 μm, is subjected to a compatibility test.

The test results are shown in the following Table 1.

Test Items (1) Adhesion Properties

Squares are formed by effecting 11 cuts respectively in length and width at about 1.5 mm intervals on a film of a test panel coated on a #25 tinplate by use of a knife. An adhesive cellophane tape having a width of 24 mm is adhered to the squares, followed by strongly peeling the tape to observe the adhesion properties of the squares and to evaluate as follows.
O:No peeling is observed.
Δ:Some peelings are observed.
x:Marked peelings are observed.

(2) Retortinq Resistant Properties

A test panel prepared by coating onto a #25 tinplate is dipped into water and is treated at 125° C. for 30 minutes in an autoclave to evaluate a degree of blushing of the film by observation with the naked eye and by the same method as in the evaluation of adhesion properties (1).
O:No blushing is observed.
Δ:Some blushing is observed.
x:Marked blushing is observed.

(3) Potassium Permanqanate Consumed

A pyrex glass bottle is charged with 100 μm aluminum foils coated with various coating compositions and water prepared by treating tap water with active carbon so that the coated area to the amount of the treated water may be 1 cm² to 1 ml and is then closed, followed by treating at 125° C. for 30 minutes in an autoclave to determine potassium permanganate consumed according to the test method defined in accordance with the Food Sanitation Act. The potassium permanganate consumed is represented in terms of ppm.

(4) Aqueous Extract Flavor Properties

A pyrex glass bottle is charged with 100 μm aluminum foils coated with various coating compositions and water prepared by treating tap water with active carbon so that the coated area to the amount of the treated water may be 2 cm² to 1 ml and is then closed, followed by being sterilized at 125° C. for 30 minutes in an autoclave and by being subjected to flavor test and evaluated as follows.
O:No change is observed.
Δ:Some changes are observed.
x:Marked changes are observed.

(5) Process Ability

Samples prepared by coating on a #25 tinplate and folded in two are placed at the bottom of a specially folded Du Pont impact tester, and a 1 kg iron weight having a smooth contacting surface is allowed to fall down from a height of 50 cm to measure length of cracks developed on the film in the folded part. Evaluation of process ability is carried out as follows.

one week and to observe development of corrosion from the cross cut.
Development of corrosion:
O:less than 0.5 mm
Δ:0.5 mm to less than 1 cm
x:more than 1 cm

(8) Compatibility

Development of haze on a film surface of a test panel prepared by coating on a #25 tinplate is observed by the naked eye.
O:No haze is observed.
Δ:Some haze is observed.
x:Marked haze is observed.

TABLE 1

| | Examples | | | | Comparative Examples | | | | | |
|---|---|---|---|---|---|---|---|---|---|---|
| | 1 | 2 | 3 | 4 | 1 | 2 | 3 | 4 | 5 | 6 |
| Starting materials | | | | | | | | | | |
| Modified epoxy resin (A) | | | | | | | | | | |
| Preparation Examples | 1 | 1 | 2 | 2 | Epikote 1007 | Araldite 6099 | Araldite 6099 | Araldite 6099 | Araldite 6099 | Epikote 1007 |
| Amounts (parts) | 70 | 60 | 65 | 50 | 70 | 65 | 50 | 80 | 65 | 80 |
| Phenol resin (B) | | | | | | | | | | |
| Preparation Examples | 3 | 4 | 3 | 4 | Hitanol 4020 | 5 | 6 | 5 | 3 | Hitanol 4020 |
| Amounts (parts) | 30 | 40 | 35 | 50 | 30 | 35 | 50 | 20 | 35 | 20 |
| Test Items | | | | | | | | | | |
| Curing conditions | 200° C. 30 sec. | 200° C. 30 sec. | 200° C. 30 sec. | 200° C. 30 sec. | 200° C. 30 sec. | 200° C. 30 sec. | 200° C. 30 sec. | 200° C. 30 sec. | 200° C. 30 sec. | 200° C. 120 sec. |
| Adhesion properties | O | O | O | O | Δ | Δ | Δ | O | O | O |
| Retorting resistant properties | | | | | | | | | | |
| Blushing | O | O | O | O | Δ | Δ | O | X | Δ | O |
| Adhesion properties | O | O | O | O | Δ | Δ | Δ | Δ | O | O |
| Gel fraction | 95 | 98 | 97 | 99 | 85 | 88 | 92 | 78 | 90 | 90 |
| Potassium permanganate consumed | 6.0 | 4.1 | 4.9 | 3.8 | 12.1 | 13.0 | 8.0 | 15.7 | 9.3 | 7.7 |
| Aqueous extract flavor properties | O | O | O | O | Δ | Δ | X | Δ | O | Δ |
| Process ability | O | O | O | O | Δ | Δ | X | Δ | Δ | Δ |
| Corrosion resistance | O | O | O | O | Δ | Δ | O | X | O | O |
| Compatibility | O | O | O | O | Δ | Δ | Δ | O | O | O |

Note:
Epikote 1007: Epoxy resin marketed by Shell Chemicals, Co., Ltd.
Araldite 6099: Epoxy resin marketed by Ciba-Geigy Ltd.
Hitanol: Phenol resin marketed by Hitachi Chemical Co., Ltd.

O:0–10 mm
Δ:10–20 mm
x:20 mm or more

(6) Gel Fraction

A vessel equipped with a reflux condenser is charged with #25 tinplates coated with various coating compositions and methyl ethyl ketone so that the coating area to the amount of methyl ethyl ketone may be 1 cm² to 1 ml, followed by heating for reflux. The gel fraction is represented by percentage of an amount of residue after one hour's reflux.

(7) Corrosion Resistance

A cross cut is formed by use of a knife on a film surface of a test panel prepared by coating onto a #25 tinplate to be dipped into an aqueous solution containing 1.5% of citric acid and salt respectively at 50° C. for

What is claimed is:
1. A can interior coating composition which contains (A) a modified bisphenol based epoxy resin formed by introducing at least one of a functional group represented by the following formula:

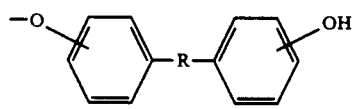

where R is a bivalent aliphatic hydrocarbon group having 1 to 4 carbon atoms, into a molecular terminal of a bisphenol based epoxy resin having an epoxy equivalent of 180 to 7,000 and a number average molecular weight of 350 to 10,000, and (B) a resol phenol resin obtained by reacting the modified bisphenol based epoxy resin (A) with at least one formaldehyde in the presence of a basic catalyst.

2. A can interior coating composition as claimed in claim 1, wherein the resol phenol resin (B) is obtained by reacting the modified bisphenol based epoxy resin (A) prepared by use of a bisphenol based epoxy resin having a number average molecular weight of 350 to 6,000 and an epoxy equivalent of 150 to 4,000, with at least one formaldehyde in an amount of 2 to 6 moles per one mole of the terminal bisphenol of the modified bisphenol based epoxy resin having an epoxy equivalent of 500 or more.

3. A can interior coating composition as claimed in claim 1 or 2, wherein a ratio of an amount of the modified epoxy resin (A) to that of the resol phenol resin (B) is in range of 40 to 95 parts by weight of the former to 60 to 5 parts by weight of the latter.

4. A can interior coating composition as claimed in claim 1 or 2, wherein a ratio of an amount of the modified epoxy resin (A) to that of the resol phenol resin (B) is in the range of 50 to 70 parts by weight of the former to 50 to 30 parts by weight of the latter.

* * * * *